Dec. 13, 1955  R. B. EYERLY  2,726,678
AUTOMATIC FLUID PRESSURE OPERATED SPRINKLER CONTROL VALVE
Filed Aug. 1, 1952
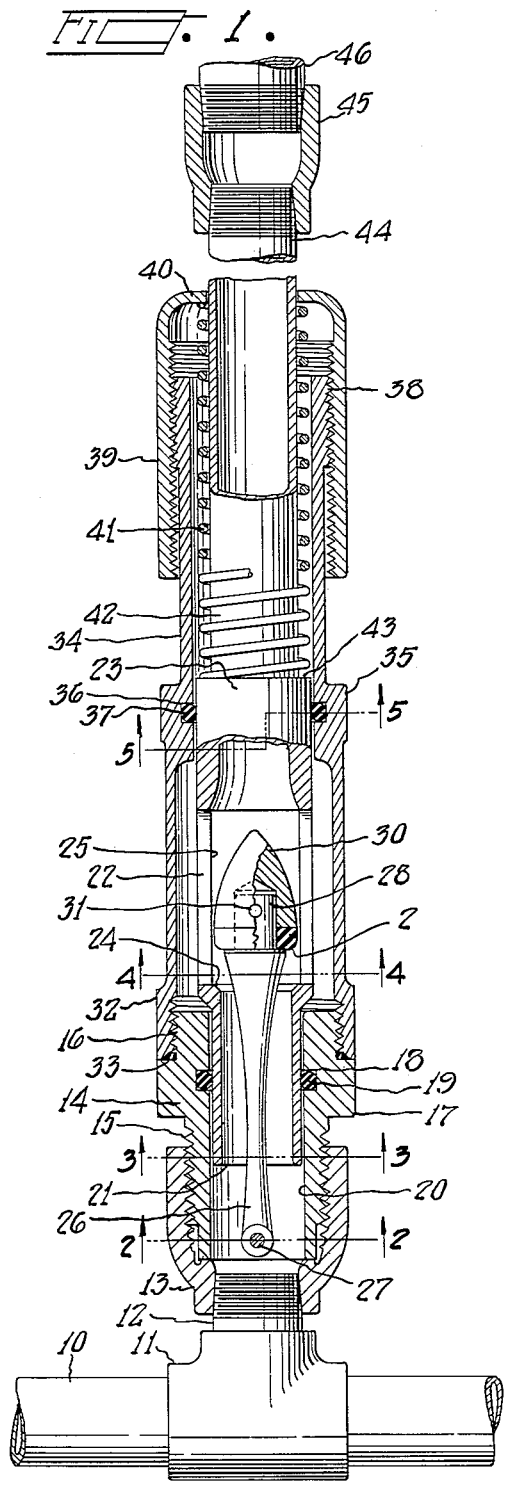
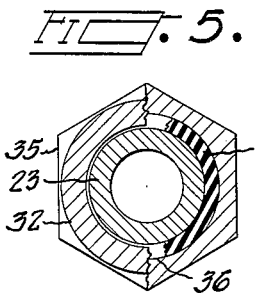
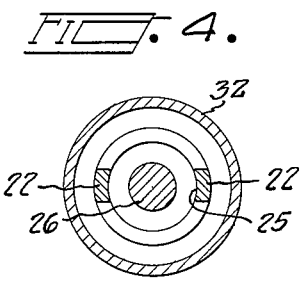
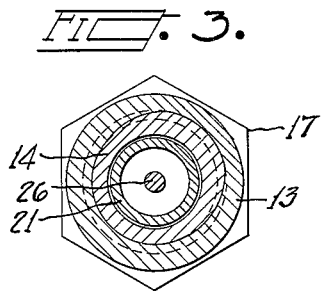
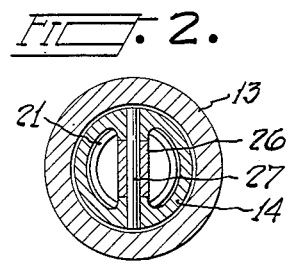
INVENTOR
RUSSELL B. EYERLY
ATTORNEY United States Patent Office 2,726,678
Patented Dec. 13, 1955

2,726,678

AUTOMATIC FLUID PRESSURE OPERATED SPRINKLER CONTROL VALVE

Russell B. Eyerly, Salem, Oreg.

Application August 1, 1952, Serial No. 302,126

6 Claims. (Cl. 137—508)

This invention relates generally to sprinkler systems and particularly to a control valve therefor.

The main object of this invention is to provide an efficient, low-priced valve whereby the flow of water to the various sprinkler heads in a series may be controlled as desired without regard to the distance a head may be from the source of supply or how many other heads may intervene.

The second object is to so control each head that the amount of water delivered thereby may be easily and accurately controlled in order that heads at higher levels may receive as much water as do heads at lower levels.

The third object is to produce a straight line flow of water through the valve.

The fourth object is to obtain a balance of pressures within the line, making it possible to accurately adjust the pressures all along a given series of sprinklers.

The fifth object is to make a valve of the class described, the parts of which are easily accessible.

I accomplish these and other objects in the manner set forth in the following specification as illustrated in the accompanying drawing, in which:

Fig. 1 is a longitudinal section through a valve.

Fig. 2 is a transverse section taken along the line 2—2 in Fig. 1.

Fig. 3 is a transverse section taken along the line 3—3 in Fig. 1.

Fig. 4 is a transverse section taken along the line 4—4 in Fig. 1.

Fig. 5 is a transverse section taken along the line 5—5 in Fig. 1.

Like numbers of reference refer to the same or similar parts throughout the several views.

Referring in detail to the drawing, there is shown a water supply pipe 10 in which are inserted branch fittings 11, into each of which is inserted a nipple 12, upon which is mounted a coupling 13, into which is threaded the cylindrical body 14, having the external thread 15 which mates with the coupling 13.

Around the opposite ends of the body 14 are formed the threads 16. Between the threads 15 and 16 is a flange 17 within which is formed a groove 18 for a rubber ring seal 19.

Extending into the bore 20 of the body 14 is a tubular lower stem 21 which is slidable within the seal 19. Extending from the upper end of the stem 21 are the arms 22 which connect the lower stem 21 to the upper stem 23. A valve seat 24 is formed around the lower stem 21 at its junction with the arms 22. The adjacent faces 25 of the members 22 are spaced farther apart than is the diameter of the seat 24.

Extending along the axis of the lower stem 21 is a valve stem 26 which is hinged by a pin 27 to the body 14. The opposite end of the stem 26 has a shouldered portion 28 over which is placed a rubber compressed seal 2 which is held in place by the pointed tip 30 which in turn is secured to the portion 28 by a pin 31.

The internal diameters of the members 21 and 23 are the same.

On the threads 16 is mounted a body 32 which is sealed to the flange 17 by means of the seal 33. The body 32 has a reduced portion 34 whose junction with the main body 32 is in the form of a hexagonal portion 35 within which is formed a groove 36 for the rubber sealing ring 37 which engages the exterior of the stem 23.

The reduced portion 24 has an external thread 38 formed thereon, upon which is threaded the cap 39 whose end 40 engages the spring 41 which is disposed around the reduced end 42 of the upper stem 23. The other end of the spring 41 engages the shoulder 43 formed between the body 32 and the stem 23.

The upper end 44 of the stem 23 is threaded to receive a reducing coupling 45 into whose larger end is threaded the pipe 46, which leads to the sprinkler head (not shown).

The operation of the valve is as follows: Water from the pipe 10 enters the valve body 14 through the nipple 12 and flows around the pointed tip 30 in an almost straight line. As the outside diameters of the stem 21 and valve seat 24 are equal, it follows that there is no outward thrust on the stem 21 other than the skin friction within the stem 21, the fluid pressure on the bottom annular edge of the upper stem 23, and whatever resistance which may be offered by the sprinkler head which is supported on the outer end of pipe 46, the compression of the spring 41 having been adjusted by means of the cap 39.

Now, if the pressure within the body 32 rises for any reason instead of increasing the flow of water through the sprinkler it partially closes the valve by moving the stem 21 and its seat 24 toward the seal 2. Thus the flow of water from all of the sprinklers can be set and held at a desired rate of flow regardless of its distance from the source or its elevation in relation thereto.

Attention is drawn to my co-pending application, Serial No. 225,514, now abandoned, over which the device described herein is an improvement.

I claim:

1. A control valve for sprinklers comprising an open-ended vertical tubular stem on the upper end of which a head can be mounted, said stem having side openings near its lower inlet end, a body slidably receiving and enclosing all of said stem except its upper end, the lower end of said body having an inlet opening communicating with the inlet end and interior of said stem and adapted for connection to a supply pipe, seals between the body and stem on both ends of said side openings, said stem having a sealing seat disposed around the stem bore adjacent the lower ends of said openings and within said stem, a valve seal within said stem at the portion having the side openings, means for anchoring said seal to said body, said seat having the same diameter as does the end portions of said stem, a spring on the upper end of the stem normally urging said seat away from said valve seal, and a screw cap on said body providing an adjustment for said spring whereby an increase in supply pressure urges the stem toward the valve seal for reducing the amount of valve opening and thus maintaining substantially constant the flow through the valve.

2. A control valve for sprinkler heads comprising a valve body having an inlet at one end and an outlet at the other end through which water can flow, an open-ended tubular stem slidably disposed within said valve body with a seal between the stem and the body, said stem having one end in communication with the inlet of the body and the other end discharging through the outlet of the body, said stem being provided with side outlet openings intermediate its ends and the ends of the body and having a seat formed around the interior of said stem intermediate the side outlet openings and the inlet end of the stem and adjacent to said side outlet openings, a valve seal member supported by said body and disposed within said stem at the location of the side outlet openings, said stem and seat being movable toward and from said valve seal, and a spring for urging relative movement between the valve seal member and said seat.

3. A control valve for sprinkler heads comprising a valve body having an inlet at one end and an outlet at the other end through which water can flow, an open-ended tubular stem slidably disposed within said valve body with a seal between the stem and body, said stem having one end in communication with the inlet of the body and the other end discharging through the outlet of the body, said stem being provided with side outlet openings intermediate its ends and the ends of the body and having a seat formed around the interior of said stem intermediate the side outlet openings and the inlet end of the stem and adjacent to said side outlet openings, a valve seal member supported by said body and disposed within said stem at the location of the side outlet openings and movable toward and from said seat, and a spring for urging relative movement between the valve seal member and said seat, said valve being characterized by having the diameter of said valve seal member approximately equal to the outside diameter of said stem.

4. A control valve for sprinkler heads comprising a valve body having an inlet at one end and an outlet at the other end through which water can flow, an open-ended tubular stem slidably disposed within said valve body with a seal between the stem and body, said stem having one end in communication with the inlet of the body and the other end discharging through the outlet of the body, said tubular stem having the bore therethrough enlarged intermediate the ends thereof with lateral openings communicating with the enlarged portion of the bore, a seat formed within said sleeve at the end of the enlarged portion adjacent the inlet end of the valve body, said seat approximating the diameter of said stem, an arm hinged to said body and having a valve seal member supported by said arm and within said enlarged portion adjacent said valve seat, and a spring for urging relative movement between said valve seal and seat.

5. A control valve for sprinkler heads comprising a valve body having an inlet at one end and an outlet at the other end through which water can flow, an open-ended tubular stem slidably disposed within said valve body with a seal between the stem and body, said stem having one end in communication with the inlet of the body and the other end discharging through the outlet of the body, said tubular stem having the bore therethrough enlarged intermediate the ends thereof with lateral openings communicating with the enlarged portion of the bore, a seat formed within said sleeve at the end of the enlarged portion adjacent the inlet end of the valve body, said seat approximating the diameter of said stem, an arm hinged to said body and having a valve seal member supported by said arm and within said enlarged portion adjacent said valve seat, and a spring for urging relative movement between said valve seal and seat, and means for regulating the compression of said spring.

6. A control valve for sprinkler heads comprising a valve body having an inlet at one end and an outlet at the other end through which water can flow, an open-ended tubular stem slidably disposed within said valve body with a seal between the stem and body, said stem having one end in communication with the inlet of the body and the other end discharging through the outlet of the body, said stem being provided with side outlet openings intermediate its ends and the ends of the body and having a seat formed around the interior of said stem intermediate the side outlet openings and the inlet end of the stem and adjacent to said side outlet openings, a valve seal member within said stem at the location of said side outlet openings and having an arm attached thereto and pivoted to said body whereby a longitudinal movement of said stem away from the pivoted end will tend to close the valve, said stem having a compression spring mounted on its discharge end and a cap secured to said body providing means for adjusting the compression of the spring.

References Cited in the file of this patent

UNITED STATES PATENTS

| 556,883 | Engstrom | Mar. 24, 1896 |
| 1,938,943 | Terry | Dec. 12, 1933 |
| 2,600,137 | League | June 10, 1952 |